US011625041B2

(12) United States Patent
Das et al.

(10) Patent No.: US 11,625,041 B2
(45) Date of Patent: Apr. 11, 2023

(54) COMBINED TRACK CONFIDENCE AND CLASSIFICATION MODEL

(71) Applicant: Zoox, Inc., Foster City, CA (US)

(72) Inventors: Subhasis Das, Menlo Park, CA (US); Shida Shen, San Mateo, CA (US); Kai Yu, Burlingame, CA (US); Benjamin Isaac Zwiebel, Burlingame, CA (US)

(73) Assignee: Zoox, Inc., Foster City, CA (US)

( * ) Notice: Subject to any disclaimer, the term of this patent is extended or adjusted under 35 U.S.C. 154(b) by 439 days.

(21) Appl. No.: 16/797,656

(22) Filed: Feb. 21, 2020

(65) Prior Publication Data

US 2021/0263525 A1 Aug. 26, 2021

(51) Int. Cl.
*G05D 1/02* (2020.01)
*G06T 7/20* (2017.01)
*G06N 20/00* (2019.01)
*G06K 9/62* (2022.01)
*G06N 3/084* (2023.01)
*G06V 10/25* (2022.01)
*G06V 20/64* (2022.01)

(52) U.S. Cl.
CPC ......... *G05D 1/0221* (2013.01); *G06K 9/6267* (2013.01); *G06N 3/084* (2013.01); *G06N 20/00* (2019.01); *G06T 7/20* (2013.01); *G06V 10/25* (2022.01); *G06V 20/64* (2022.01); *G05D 2201/0213* (2013.01); *G06T 2207/30232* (2013.01)

(58) Field of Classification Search
CPC ......... G05D 1/0221; G05D 2201/0213; G06N 20/00; G06N 3/084; G06V 10/25; G06V 20/64; G06K 9/6267; G06T 7/20; G06T 2207/30232
See application file for complete search history.

(56) References Cited

U.S. PATENT DOCUMENTS

| | | | | |
|---|---|---|---|---|
| 10,445,928 B2 * | 10/2019 | Nehmadi | ............. | G06T 3/4007 |
| 10,761,538 B2 * | 9/2020 | Ball | ................. | G05D 1/0236 |
| 10,867,210 B2 * | 12/2020 | Mao | .................. | G06K 9/6227 |
| 11,133,953 B2 * | 9/2021 | Shive | .................. | G06N 5/04 |
| 11,210,537 B2 * | 12/2021 | Koivisto | .............. | G05D 1/00 |
| 11,214,261 B2 * | 1/2022 | Bluvstein | ............. | G06V 20/58 |

(Continued)

FOREIGN PATENT DOCUMENTS

WO WO2016110728 A1 7/2016
WO WO2019164668 A1 8/2019

OTHER PUBLICATIONS

The PCT Search Report and Written Opinion dated May 21, 2021 for PCT Application No. PCT/US21/18334, 10 pages.

*Primary Examiner* — Gregory M Desire
(74) *Attorney, Agent, or Firm* — Lee & Hayes, P.C.

(57) ABSTRACT

Techniques are disclosed for a combined machine learned (ML) model that may generate a track confidence metric associated with a track and/or a classification of an object. Techniques may include obtaining a track. The track, which may include object detections from one or more sensor data types and/or pipelines, may be input into a machine-learning (ML) model. The model may output a track confidence metric and a classification. In some examples, if the track confidence metric does not satisfy a threshold, the ML model may cause the suppression of the output of the track to a planning component of an autonomous vehicle.

17 Claims, 4 Drawing Sheets

(56) References Cited

U.S. PATENT DOCUMENTS

| | | |
|---|---|---|
| 11,354,913 B1* | 6/2022 | Houston .................. G01S 7/417 |
| 11,440,196 B1* | 9/2022 | Kirmani .................... G06N 3/08 |
| 11,453,122 B2* | 9/2022 | Knott ..................... B25J 13/085 |
| 2014/0219510 A1 | 8/2014 | Nagaoka et al. |
| 2017/0113686 A1 | 4/2017 | Horita et al. |
| 2021/0263525 A1* | 8/2021 | Das .......................... G06T 7/246 |

* cited by examiner

COMBINED TRACK CONFIDENCE AND CLASSIFICATION MODEL

BACKGROUND

Detecting and tracking objects is used in numerous applications, such as operating autonomous vehicles, identifying individuals for security purposes, etc. Detection and tracking techniques may use sensors to capture data regarding an environment and use this sensor data to detect objects in the environment. Since detection and tracking techniques may utilize two or more different types of sensors, the sensor data may widely vary in its format and content, and the detections algorithms may process the sensor data differently, the detections generated by different sensor types may differ.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
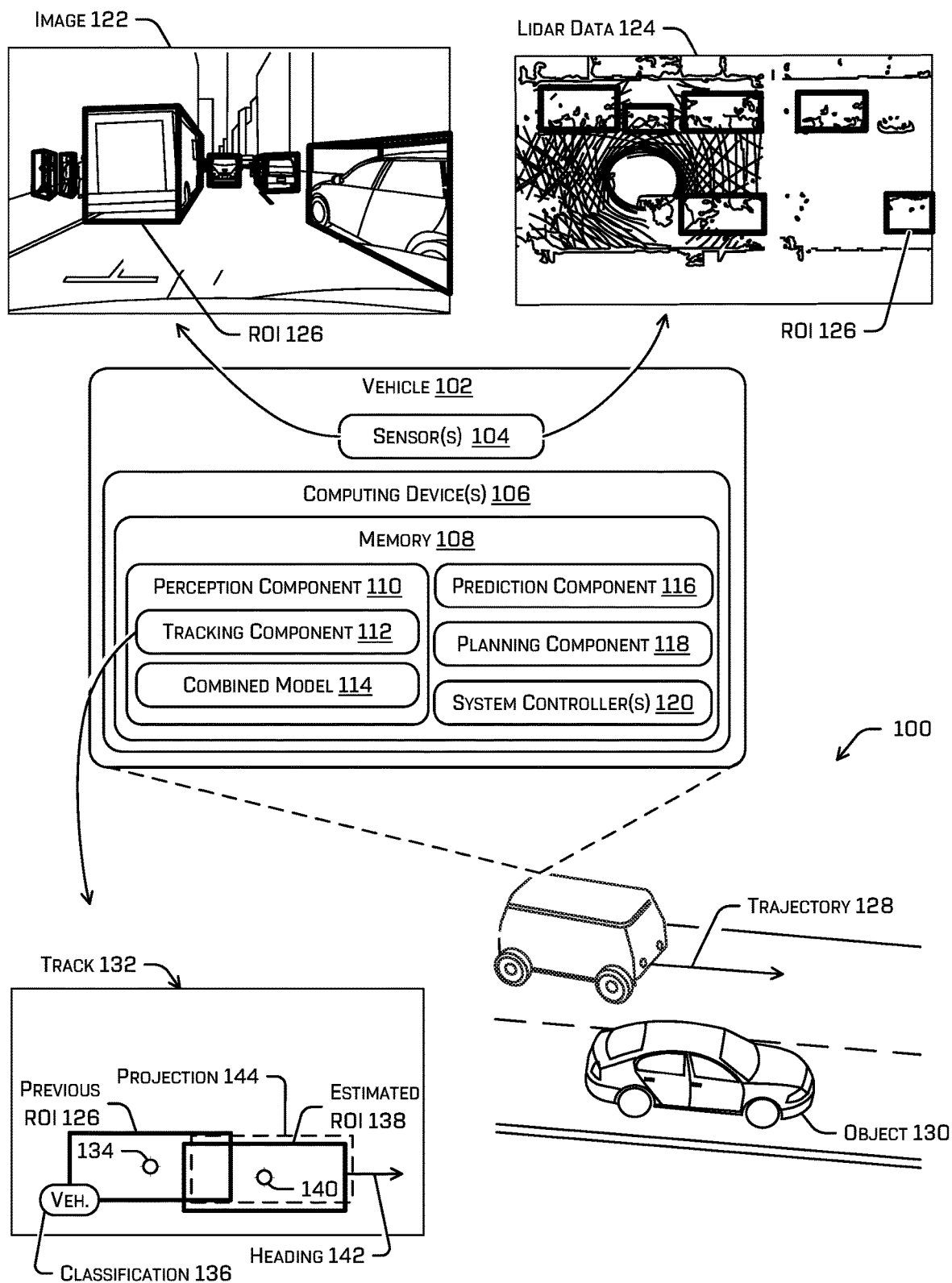
FIG. 1 illustrates an example scenario in which an autonomous vehicle configured with a perception component including a tracking component that may track an object in an environment surrounding the autonomous vehicle and a combined model that may provide both a track confidence metric and classification for the track.

The techniques discussed herein generally relate to a combined track confidence and classification model (also referred to herein as "combined model") that may determine both a track confidence metric and a classification for a track based at least in part on output from one or more pipelines (e.g., series of steps or operations performed on data to yield a particular result which, in at least some examples, comprise the use of only data of a certain type or sub-type). In some examples, the one or more pipelines (which, throughout may be referenced as perception pipelines, as they operate on perception data) may be associated with different sensor types (e.g., a pipeline associated with a single type of sensors, such as lidar sensor(s), camera(s), radar sensor(s); and/or a pipeline associated with a hybrid combination of sensors such as lidar-vision, and/or the like. A tracking component may accept input from the one or more pipelines and generate one or more tracks. More particularly, a tracking component may be configured to track and output a track comprising the current and/or previous position, velocity, acceleration, and/or heading of a detected object (or tracked object) based on pipeline data received from the one or more pipelines. A track confidence metric may provide a measure of whether an associated track is a true-positive (the corresponding tracked object exists in the environment) or a false-positive (the corresponding tracked object was detected and tracked by the pipelines and tracking component but does not exist in the environment). Further, the classification output by the combined model for a track may include a coarse classification and/or a fine-grained classification which may be determined based on information from one or more perception pipelines. In some autonomous vehicle implementations of an autonomous operation system, coarse classifications of tracked objects of tracks may include general categories such as vehicle, pedestrian, bicyclist, and clutter while fine classifications of tracked objects of tracks may be, for example, more specific subcategories with service vehicle, motorcycle, tractor-trailer, sedan, pickup, and so on being fine classifications within the coarse classification of vehicle.

In some examples described in detail herein, a track may comprise an association of detections over a period of time with a historical record of previous positions, orientations, sizes (extents), classifications, etc. of a detected object, in addition to kinematic and/or dynamic information associated with such an object over time (e.g., linear and/or angular velocity, linear and/or angular accelerations, etc.).

In some examples, the combined model may be utilized in the automated operation system of an autonomous vehicle or similar autonomous or partially autonomous systems. The track confidence metric may be utilized to determine whether to output the associated track to the prediction and/or planning components of the automated operation system. In other examples, the associated track may be output with the track confidence metric to the prediction and/or planning components of the automated operation system. In turn, the prediction and/or planning components may utilized the track confidence metric to determine a weight (e.g. a up-weight or down-weight) to give the associated track. The classification (e.g., the coarse and/or fine-grained classifications) may be utilized by the prediction and/or planning components to predict the changes and behavior of the objects associated with the tracks and/or plan a trajectory or other actions for the autonomous operation system.

The techniques discussed herein may improve detecting and tracking of objects by, for example, increasing the accuracy of tracks and classifications thereof and/or improve detections of objects, generally. For example, the track confidence metric output by the combined model may be used to detect and/or suppress a false positive generated by the tracking component and avoiding excessive reliance on a particular pipeline or pipelines which may lead to scenarios in which a detection of an actual object in other pipelines is disregarded due to non-detection by the overly relied upon pipeline(s). Further, the determination of a classification by the combined model based on information from multiple perception pipelines may allow for classification when some of the pipelines do not provide object detections of the tracked object, thereby eliminating excessive dependency on a particular pipeline and reducing redundant or conflicting data. Heuristic logic for determining whether an object and/or track is a false-positive or true positive may be difficult to develop and refine, requiring significant investment to improve. The operation of the combined model to produce both a track confidence metric and a classification for a track (e.g. a classification for a corresponding tracked object of the track) may reduce computation and latency in the system as well as make system development and refinement simpler.

As mentioned above, the track confidence metric may indicate the likelihood that track data aggregated from multiple perception pipelines (referred to herein as aggregated track data of track) corresponds to an object in the environment. For example, the track confidence metric may be a value between 0 and 1, where 0 represents an indication by the combined model that the track has a low likelihood of being a true positive and where 1 indicates that the track has a high likelihood of being a true positive, although other permutations are contemplated.

The track confidence metric determination may operate based at least in part on the output of a plurality of perception pipelines and the output of a tracking component. The pipeline data may include information about object detections by respective pipelines. A tracking component may be configured to track and output a current and/or previous position, velocity, acceleration, and/or heading of a detected object based on pipeline data received from the perception pipelines. In some examples, the output of the plurality of perception pipelines may be aggregated into aggregated track data associated with a tracked object by the tracking component.

In general, tracking may comprise determining whether to associate a current object detection generated from recently received (e.g., current) sensor data with another object detection generated from other (e.g. formerly received) sensor data. Aggregated track data of a track may identify that an object detected in former sensor data and current sensor data and/or current pipeline data output by multiple perception pipelines is the same object. In some examples, the data aggregated into the aggregated track data may comprise at least a portion of the pipeline outputs for the current time and/or one or more previous times.

In some examples, the sensors may input sensor data to the perception pipelines at intervals or in input cycles. The perception pipelines may generate and output pipeline data to the tracking component for each input cycle. In some examples, the pipelines may be synchronized to generate pipeline outputs at a frequency that may correspond to input cycles (e.g., every 100 milliseconds, every 500 milliseconds, every second). In an example where the pipelines are synchronized to output pipeline data at substantially the same time every 500 milliseconds (e.g., 500 ms cycles), the aggregated track data may comprise the data discussed above for 0 milliseconds (i.e., a set of data corresponding to a most recently received sets of pipeline data the current input cycle), −500 milliseconds, −1 second, and so on. In at least one example, the aggregated track data may comprise pipeline data for the time steps 0 milliseconds, −100 milliseconds, −200 milliseconds, −300 milliseconds, and/or −400 milliseconds, and/or −1 second, −2 seconds, and/or −3 seconds, although any suitable time steps or cycle length may be used. In some examples, track data associated with every time cycle or interval (e.g., every other cycle) over a time window may be input to the combined model with the current track data.

As mentioned above, the pipeline data may include information about object detections which may be utilized to determine the track. For example, the pipeline data may comprise an indication of one or more regions of interest (ROIs) determined by an ML model of at least one of the pipelines and identifying a portion of sensor and/or perception data associated with the object. For example, the pipeline data output by a pipeline may comprise a center, extents, and/or yaw of a region of interest (ROI) associated with an object detected by the pipeline. In some examples, the region of interests discussed herein may be a three-dimensional region of interest and/or a two-dimensional region of interest (e.g., a top-down/bird's eye perspective of the environment). Some examples may include receiving multiple regions of interest (ROIs) for different portions of an image. The ROIs may be in any form that may identify the existence of an object in the image. For example, an ROI may include a box or other shape indicative of pixels identified as being associated with the detected object (a "bounding box"), a mask that includes pixels that correspond to the detected object, etc.

The tracking component may utilize the information about object detections to match object detections from multiple pipelines and object detections from different input cycles. The tracking component may generate track data for a track that includes information about the matched object detections. As such, in some examples, the track may comprise the center, extents, and/or yaw of a region of interest (ROI) associated with an object and/or similar information regarding previous ROI(s) generated in association with the track in prior cycles.

The track data may additionally or alternatively include other data about the tracked object. For example, the track data may include a classification associated with the object (e.g., a vehicle, an oversized vehicle, a pedestrian, a cyclist), a current/or previous heading associated with the object, a current and/or previous velocity and/or acceleration of the object, and/or a current and/or previous position of the object.

In some examples, other components may utilize the track data output by the tracking component to control an autonomous vehicle. For example, a planning component of an autonomous vehicle may predict motion/behavior of the detected object and determine a trajectory and/or path for controlling an autonomous vehicle based at least in part on such current and/or previous data.

As mentioned above, some perception pipelines of the perception component may be associated with, and operate based on data from, respective sets of sensors. Some example perception pipelines associated with respective sets of sensors may include single sensor type pipelines, such as a vision pipeline, a lidar pipeline, a radar pipeline and so on, and/or combined sensor type pipelines, such as a vision-lidar pipeline, a vision-lidar-radar pipeline, and/or the like. In some examples, at least one perception pipeline may be a fusion detector or deep tracking network component which may operate based at least in part on data from other perception pipelines. For example, see U.S. patent application Ser. No. 16/779,576 which claims the benefit of U.S. Patent Application No. 62/926,423, both of which are incorporated herein in their entirety.

Additionally or alternatively, a perception pipeline may determine an object confidence score for object detections produced by the pipeline. For example, a pipeline may include a ML model that may produce an object confidence score that is indicative of whether the pipeline actually identified a salient object in the image and/or how well a ROI associated with the object fits the object. For example, an object confidence score may be a value between 0 and 1, where 0 represents an indication that there is a low likelihood an object appears in the ROI and where 1 indicates that there is a high likelihood an object appears in the ROI, although other permutations are contemplated. The object confidence may be included in the information relating to object detections in the pipeline data. In other words, the pipeline may output an indication of where an object might be and a score that indicates how likely it correctly identified an object and/or how well the ROI points out where the object is in the image.

As mentioned above, the tracking component may receive the information regarding detections output by the one or more perception pipelines as pipeline data. The tracking component may compare the information regarding detections in the pipeline data to determine tracks that relate to the same object. Pipeline data related to the same object may be combined to generate aggregated track data. For example, pipeline data from a pipeline may be compared to data of existing tracks to determine whether an existing track matches the pipeline data. If an existing track is found to match the pipeline data, the track data may be incorporated into the existing aggregated track data. Otherwise, a new track may be generated based on the pipeline data. Additional details related to the generation of tracks by the tracking component are provided in U.S. patent application Ser. No. 16/297,381, which is incorporated in its entirety herein. The aggregated track data may then be analyzed by the combined model to generate a track confidence metric and classification for the track associated with the aggregated track data.

The combined model may, in some examples, comprise a single machine learned model that may infer both the track confidence metric for a track and a classification of an object associated with the track. In at least one non-limiting example, the combined model may be a single multi-layer perceptron which may receive aggregated track data including data from multiple perception pipelines as input to generate the track confidence metric and a coarse and/or fine-grained classification of an object associated with the aggregated track data.

An example set of data that may be input to the combined model may include, for example, lidar, radar, vision, and fusion pipeline object detections such as semantic segmentation probabilities for lidar and vision (e.g., in the form of float probability vectors); a metric indicating the existence of object detections associated with the track for each perception pipeline; object detection statistics for the track such as total number of voxels in lidar object detections, vision object detection confidence, radar object detection doppler ambiguity resolving status, and so on (which may be input to the combined model as continuous float values). The combined model may additionally or alternatively receive as input classification data from the vision pipeline and/or top down segmentation probabilities from the lidar pipeline (e.g., in the form of one-hot vectors or vectors of probability values). Further, the input to the combined model may additionally or alternatively include geometric properties, such as velocity, extent, the fraction of the object which may be occluded, distance from the device including the sensors, and so on. In addition to the above data, any previously generated data associated with the track from prior cycles, ticks, or operations may also be utilized by the combined model.

While example forms for example inputs are provided above, embodiments are not so limited and such forms may vary from implementation to implementation. For example, inputs may be discretized into one-hot vectors or input as continuous values depending on the implementation.

Additional details relating to non-limiting example systems for training and utilizing the combined track confidence and classification model are provided below with reference to the figures.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a tracking component 112, a combined model 114, a prediction component 116, a planning component 118, and/or system controller(s) 120. As illustrated, the perception component 110 may comprise a tracking component 112 and/or a combined model 114. Although as depicted in FIG. 1 for illustrative purposes, it should be understood that the tracking component 112 and/or combined model 114 may reside in/on a separate computing device (or otherwise) than any one or more of the other components. In general, the perception component 110 may determine what is in the environment surrounding the vehicle 102, the prediction component 116 may estimate or predict the future movements or behaviors of objects in the environment surrounding the vehicle 102, and the planning component 118 may determine how to operate the vehicle 102 according to information received from the perception component 110 and/or prediction component 116. For example, the planning component 118 may determine trajectory 128 based at least in part on the perception data, prediction data and/or other information such as, for example, one or more maps, localization information (e.g., where the vehicle 102 is in the environment relative to a map and/or features detected by the perception component 110), and/or the like. The trajectory 128 may comprise instructions for system controller(s) 120 to actuate drive components of the vehicle 102 to effectuate a steering angle and/or steering rate, which may result in a vehicle position, vehicle velocity, and/or vehicle acceleration. For example, the trajectory 128 may comprise a target heading, target steering angle, target steering rate, target position, target velocity, and/or target acceleration for the controller(s) 120 to track. The perception component 110, the prediction component 116, the planning component 118, and/or the tracking component 112 may include one or more machine-learned (ML) models and/or other computer-executable instructions.

In some examples, the perception component 110 may receive sensor data from the sensor(s) 104 and determine data related to objects 130 in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different perception pipelines useful for localizing the autonomous vehicle), local map data that identifies characteristics detected in proximity to the vehicle (e.g., locations and/or dimensions of buildings, trees, fences, fire hydrants, stop signs, and any other feature detectable in various perception pipelines), etc. The object classifications determined by the perception component 110 may distinguish between different object types such as, for example, a passenger vehicle, a pedestrian, a bicyclist, a delivery truck, a semi-truck, traffic signage, and/or the like. The data produced by the perception component 110 may be collectively referred to as perception data.

In some examples, the perception component 110 may monitor as much of the environment surrounding the autonomous vehicle as possible, which may be limited by sensor capabilities, object and/or environmental occlusions (e.g., buildings, elevation changes, objects in front of other objects), and/or environmental effects such as fog, snow, and/or the like. For example, the sensor data may comprise image data 122, LIDAR 124 and/or radar data (not shown), which the perception component 110 may receive as input. The perception component 110 may be configured to detect as many objects and information about the environment as possible to avoid failing to account for an event or object behavior that should be taken into account by the prediction component 116 in predicting changes in or behavior of the object and by the planning component 118 in determining the trajectory 128.

In some examples, the perception component 110 may comprise one or more pipelines of hardware and/or software, which may include one or more GPU(s), ML model(s), Kalman filter(s), and/or the like. For example, perception data may comprise outputs of sensor specific pipelines (e.g., vision, lidar, radar), hybrid sensor pipelines (e.g., vision-lidar, radar-lidar), and/or fusion pipelines (e.g., pipelines that operate based at least in part on the output of other pipeline(s)) of the perception component.

In some examples, the tracking component 112 of the perception component 110 may produce track data based at least in part on the sensor data received from the sensors 104. In some examples, the track data may be part of the perception data output by the perception component 110. More particularly, the tracking component 112 may determine the track data based on pipeline data received from the one or more perception pipelines of the perception component 110. For example, the perception component 110 may include perception pipelines associated with sets of sensors 104. In some examples, each type of sensor 104 may be associated with one or more perception pipelines of the perception component 110. Some perception pipelines may be associated with multiple types of sensors. In addition or alternatively, some perception pipelines may operate based on detection data output by one or more other perception pipelines (e.g., a pipeline associated with a fusion detector such as a deep tracking network). The multiple pipelines may each detect objects and generate detection information for detected objects in each input cycle.

The pipeline data output by each pipeline may comprise one or more object detections. In some examples, the detected object of the track may be associated with a region of interest (ROI) that indicates the position of the object in the environment and/or any of the other perception data. Such ROIs are illustrated in FIG. 1 in which image 122 and lidar data 124 each include an ROI 126 associated with the indicated truck.

The tracking component 112 may aggregate object detections from the various pipelines with tracks from prior cycles (e.g., based on a similarity threshold which may consider various data, such as how closely the current location of the tracked object matches across pipelines for current detections and how closely the current location matches a projected location determined based on the track generated based on prior cycles).

In particular, in some examples, each pipeline of the component 112 discussed herein may determine object detections from sensor data generated by one or more sensor types (e.g., discrete sensor types such as lidar, RGB camera, thermal image, sonar, radar; or hybrid sensor types such as vision-lidar association, lidar-radar association). As shown in FIG. 1, a track 132 may comprise at least a previous region of interest 126, which may comprise a center 134, extents, a heading, a classification 136 and so on. An object detection may comprise an estimated ROI 138 with an estimated center 140 and a heading 142. In some examples, the technique discussed herein may comprise projecting the previous ROI 126 based at least in part on a velocity and/or heading associated with the track to establish a projection 144. The object detection may be compared to the projection 144 to determine if the object detection matches the track.

In some examples, one or more detections may be matched to a prior track or, if no matches are determined, a new track may be generated and the one or more detections may be associated therewith. The perception component 110 may output any of this data to the combined model 114.

The combined model 114 may, in some examples, comprise a single machine learned model that may infer both the track confidence metric for a track and a classification of an object associated with the track. In other words, the combined model 114 may generate the classification portion of the perception data output by the perception component 110, for example, instead of the perception component 110 or tracking component 112 thereof including a separate classification component. In some examples, the combined model 114 may be a multi-layer perceptron model which may operate based at least in part on aggregated track data including data from multiple perception pipelines to determine the track confidence metric and a coarse and/or a fine-grained classification of an object associated with the aggregated track data. In some examples, the classification output by the combined model 114 may be aggregated into the aggregated track data.

An example set of aggregated track data that may be input to the combined model 114 may include, for example, lidar, radar, vision, and/or fusion pipeline object detections such as semantic segmentation probabilities for lidar and vision (e.g., in the form of float probability vectors, a probability distribution over a mask or field); a metric indicating the existence of object detections associated with the track for each perception pipeline; object detections statistics for the track such as total number of voxels in lidar detections, vision detection confidence, radar detection doppler ambiguity resolving status, and so on (which may be input to the combined model as continuous float values). In some examples, the combined model 114 may additionally or alternatively receive classification data as input from a vision pipeline (a pipeline which operates on image data) and top-down segmentation probabilities from the lidar pipeline (e.g., in the form of one-hot vectors, vectors of probability values, or an image having pixel values associated with the probabilities). Further, the input to the combined model 114 may additionally or alternatively include geometric properties, such as velocity, extent, fraction occluded, distance from the device including the sensors, and so on. In addition to the above data, any previously generated data associated with the track from prior cycles, ticks or operations may also be utilized by the combined model 114.

In some examples, once the perception component 110 has generated the perception data (e.g., the tracking component 112 has generated aggregated track data and the combined model 114 has generated a track confidence metric and classification for the track(s)), the perception component 110 may determine track(s) with track confidence metrics above a threshold. The perception component 110 may then provide the perception data associated with track(s) having track confidence metrics meeting or exceeding the threshold to the prediction component 116 and/or planning component 118. In other examples, the associated track may be output with the track confidence metric to the prediction component 116 and/or planning component 118. In turn, the prediction and/or planning components may utilize the track confidence metric to determine a weight (e.g. a up-weight or down-weight) to give the associated track.

The planning component 118 may determine one or more trajectories 128 to control motion of the vehicle 102 based at least in part on the perception data received from perception component 110 and/or prediction data received from the prediction component 116. In some examples, the planning component 118 may determine the one or more trajectories 128 to control the vehicle 102 to traverse a path or route, and/or otherwise control operation of the vehicle 102, though any such operation may be performed in various other components (e.g., localization may be performed by a localization component, which may be based at least in part on perception data). For example, the planning component 118 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 128 of the vehicle 102 that may be used to generate a drive control signal that may be transmitted to drive components of the vehicle 102. FIG. 1 depicts an example of such a trajectory 128, represented as an arrow indicating a heading, velocity, and/or acceleration, although the trajectory itself may comprise instructions for controller(s) 120, which may, in turn, actuate a drive system of the vehicle 102.

In some examples, the controller(s) 120 may comprise software and/or hardware for actuating drive components of the vehicle 102 sufficient to track the trajectory 128. For example, the controller(s) 120 may comprise one or more proportional-integral-derivative (PID) controllers.

Example System

Figure 2:
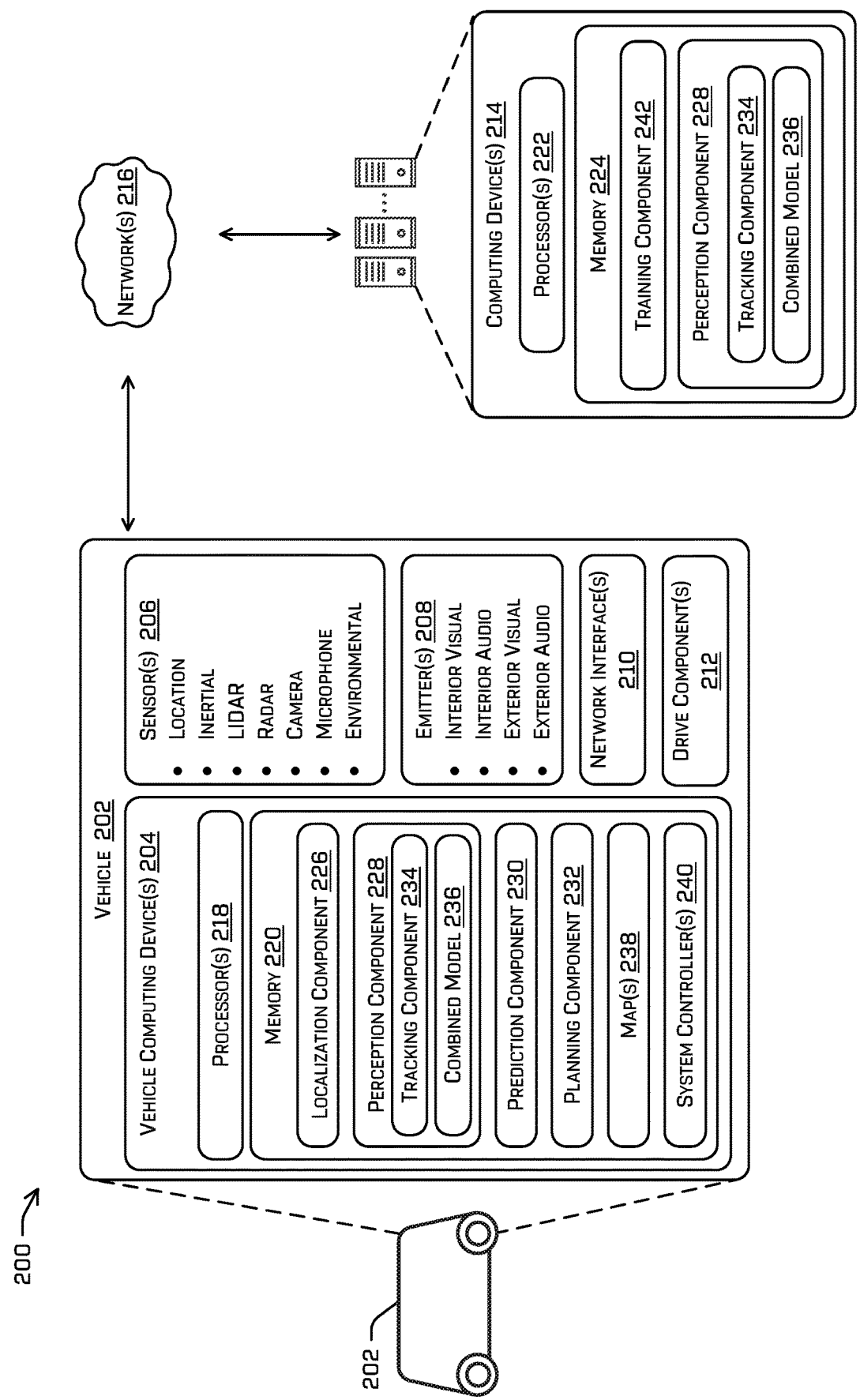
FIG. 2 illustrates a block diagram of an example system comprising a perception component including a tracking component and a combined model.

FIG. 2 illustrates a block diagram of an example system 200 that implements the techniques discussed herein. In some instances, the example system 200 may include a vehicle 202, which may represent the vehicle 102 in FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 202 may be a fully or partially autonomous vehicle having any other level or classification. Moreover, in some instances, the techniques described herein may be usable by non-autonomous vehicles as well.

The vehicle 202 may include a vehicle computing device(s) 204, sensor(s) 206, emitter(s) 208, network interface(s) 210, and/or drive component(s) 212. Vehicle computing device(s) 204 may represent computing device(s) 106 and sensor(s) 206 may represent sensor(s) 104. The system 200 may additionally or alternatively comprise computing device(s) 214.

In some instances, the sensor(s) 206 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 206 may include multiple instances of each of these or other types of sensors. For instance, the radar sensors may include individual radar sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204 and/or to computing device(s) 214.

The vehicle 202 may also include emitter(s) 208 for emitting light and/or sound, as described above. The emitter(s) 208 in this example may include interior audio and visual emitter(s) to communicate with passengers of the vehicle 202. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 208 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 202 may also include network interface(s) 210 that enable communication between the vehicle 202 and one or more other local or remote computing device(s). For instance, the network interface(s) 210 may facilitate communication with other local computing device(s) on the vehicle 202 and/or the drive component(s) 212. Also, the network interface (s) 210 may additionally or alternatively allow the vehicle to communicate with other nearby computing device(s) (e.g., other nearby vehicles, traffic signals, etc.). The network interface(s) 210 may additionally or alternatively enable the vehicle 202 to communicate with computing device(s) 214. In some examples, computing device(s) 214 may comprise one or more nodes of a distributed computing system (e.g., a cloud computing architecture).

The network interface(s) 210 may include physical and/or logical interfaces for connecting the vehicle computing device(s) 204 to another computing device or a network, such as network(s) 216. For example, the network interface(s) 210 may enable Wi-Fi-based communication such as via frequencies defined by the IEEE 200.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s). In some instances, the vehicle computing device(s) 204 and/or the sensor(s) 206 may send sensor data, via the network(s) 216, to the computing device(s) 214 at a particular frequency, after a lapse of a predetermined period of time, in near real-time, etc.

In some instances, the vehicle 202 may include one or more drive components 212. In some instances, the vehicle 202 may have a single drive component 212. In some instances, the drive component(s) 212 may include one or more sensors to detect conditions of the drive component(s) 212 and/or the surroundings of the vehicle 202. By way of example and not limitation, the sensor(s) of the drive component(s) 212 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 212. In some cases, the sensor(s) on the drive component(s) 212 may overlap or supplement corresponding systems of the vehicle 202 (e.g., sensor(s) 206).

The drive component(s) 212 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 212 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 212. Furthermore, the drive component(s) 212 may also include one or more communication connection(s) that enable communication by the respective drive component with one or more other local or remote computing device(s).

The vehicle computing device(s) 204 may include processor(s) 218 and memory 220 communicatively coupled with the one or more processors 218. Memory 220 may represent memory 108. Computing device(s) 214 may also include processor(s) 222, and/or memory 224. The processor(s) 218 and/or 222 may be any suitable processor capable of executing instructions to process data and perform operations as described herein. By way of example and not limitation, the processor(s) 218 and/or 222 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 220 and/or 224 may be examples of non-transitory computer-readable media. The memory 220 and/or 224 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 220 and/or memory 224 may store a localization component 226, perception component 228, prediction component 230, planning component 232, tracking component 234, combined model 236, map(s) 238, system controller(s) 240 and/or a training component 242. Perception component 228 may represent perception component 110, prediction component 230 may represent prediction component 116, planning component 232 may represent planning component 118, tracking component 234 may represent tracking component 112, and/or combined model 236 may represent combined model 114.

In at least one example, the localization component 226 may include hardware and/or software to receive data from the sensor(s) 206 to determine a position, velocity, and/or orientation of the vehicle 202 (e.g., one or more of an x-, y-, z-position, roll, pitch, or yaw). For example, the localization component 226 may include and/or request/receive map(s) 238 of an environment and can continuously determine a location, velocity, and/or orientation of the autonomous vehicle within the map(s) 238. In some instances, the localization component 226 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 226 may provide data to various components of the vehicle 202 to determine an initial position of an autonomous vehicle for generating a trajectory and/or for generating map data, as discussed herein. In some examples, localization component 226 may provide, to the tracking component 234, a location and/or orientation of the vehicle 202 relative to the environment and/or sensor data associated therewith.

In some instances, perception component 228 may comprise a primary perception system and/or a prediction system implemented in hardware and/or software. The perception component 228 may detect object(s) in in an environment surrounding the vehicle 202 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 228 is referred to as perception data.

The prediction component 230 can generate one or more probability maps representing prediction probabilities of possible locations of one or more objects in an environment. For example, the prediction component 230 can generate one or more probability maps for vehicles, pedestrians, animals, and the like within a threshold distance from the vehicle 202. In some instances, the prediction component 230 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planning component 232 may receive a location and/or orientation of the vehicle 202 from the localization component 226 and/or perception data from the perception component 228 and may determine instructions for controlling operation of the vehicle 202 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 240 and/or drive component(s) 212 may parse/cause to be carried out, second instructions for the emitter(s) 208 may be formatted according to a second format associated therewith).

The tracking component 234 may operate on the vehicle 202 and/or on the computing device(s) 214. In some examples, the tracking component 234 may be upstream (provide input to) from the combined model 236, the prediction component 230 and planning component 232 in a pipeline. The tracking component 234 may be configured to pass all, part, or none of the output of the tracking component 234 to the prediction component 230 and planning component 232 based at least in part on whether a track confidence metric determined by the combined model 236 meets a threshold. In some examples, combined model 236 may output the tracking component output to the prediction component 230 and/or planning component 232 for the tracking component 234.

In some examples, the perception component 228 may produce pipeline or detection data based on the sensor data received from the sensors 206. For example, the perception component 228 may include perception pipelines associated with sets of sensors 104. In some examples, each type of sensor 206 may be associated with one or more perception pipelines of the perception component 228. Some perception pipelines may be associated with multiple types of sensors. In addition or alternatively, some perception pipelines may operate based on detection and/or tracking data output by one or more other perception pipelines (e.g. a pipeline associated with a fusion detector such as a deep tracking network). The multiple pipelines may each detect objects and generate detections for objects each input cycle. At any rate, the tracking component 234 may determine whether or not to aggregate an object detection in the pipeline data with an existing track or to generate a new track in association with an object detection. Additional details of the operation of tracking component 234 may be understood with reference to the discussion above of tracking component 112.

The combined model 236 may, in some examples, comprise a single machine learned model that may infer both the track confidence metric for a track and a classification of an object associated with the track. More specifically, the combined model 236 may be a single multi-layer perceptron model which may operate based on aggregated track data including data from multiple perception pipelines to generate the track confidence metric and a classification (which may include both a coarse and a fine grained classification) of an object associated with the aggregated track data. Additional details of the operation of combined model 236 may be understood with reference to the discussion above of combined model 114.

The training component 242 may operate to perform machine learning training operations for the combined model 236. In particular, the training component 242 may train the combined model 236 to output a track confidence metric and a classification (which may include both a coarse and a fine grained classification) in association with an object that is detected as being represented in aggregated track data. As discussed above, the aggregated track data may be based on pipeline data output from multiple perception pipelines and matching track data from prior intervals or cycles, if any. In other words, the combined model 236 may be trained to determine the track confidence metric for a track, i.e., thereby providing a measure of the likelihood a track output by the tracking component 234 is a "false positive." At the same time, the combined model may also be trained to determine a classification of the tracked object. In some autonomous vehicle implementations, coarse classifications may include general categories such as vehicle, pedestrian, bicyclist and clutter while fine classifications may be more specific, for example with service vehicle, motorcycle, tractor-trailer, sedan, pickup, and so on being fine classifications within the coarse classification of vehicle.

In some examples, the training component 242 may operate to train the combined model 236 by using supervised learning and by backpropagating loss through the combined model 236.

In some examples, the training component 242 may backpropagate a loss for the track confidence metric and one or more losses for the coarse and/or fine classifications. In some examples, a loss may be calculated for each output of the combined model (e.g., based at least in part on ground truth data that specifies a current ROI and/or a previous ROI in a prior input cycle to which the current ROI corresponds and coarse and/or fine classifications for an object associated with the current ROI). For example, one or more losses may be calculated from corresponding combined model outputs and ground truth data using sigmoid functions. The ground truth data may, for example, be included with or annotated into the input data provided to the combined model 236 by the tracking component 234. In those examples where multiple perception pipelines are used, the ground truth data may include ROIs for each type of sensor data. Backpropagating the loss to train the combined model 236 may further refine the accuracy of the combined model 236. In some examples, the training of the combined model 236 may use determine a loss for the track confidence metric, a loss for the coarse classification and a loss for the fine classification. Other examples may include combined ground truth data and/or a combined loss for the training the coarse and fine classification outputs. Training may then propagate the losses back through the combined model for refinement. In autonomous vehicle systems, once the combined model is trained, the trained combined model may be output to one or more autonomous vehicles for used in future operations.

As mentioned above, the training may be based training data that includes annotations. For example, in an autonomous vehicle implementation, the training data may include one or more types of sensor data. One or more of the types of sensor data may include annotations identifying objects in the sensor data and providing a classification for the identified objects. The sensor data may be input to perception pipelines to provide pipeline data. The pipeline data may be provided to the tracking component which may output one or more tracks. The one or more tracks may be processed by the combined model and the combined model may output a track confidence metric and a classification for each track generated based on the training data. The training component 242 may then use the annotations attached to the sensor data to determine whether outputs from the combined model were correct or incorrect and back propagate a loss based thereon. For example, for a given track, the training component may determine the track corresponds to an object included in the annotations. For example, the training component may determine whether a tracked object matches an object identified in the annotations by determining if an intersection over union (IOU) of an object identified in the annotations with the tracked object meets or exceeds a threshold. The training component 242 may determine a loss for the track confidence metric of the track based whether a match was found using the IOU and the magnitude of the track confidence metric. Similarly, when an object in the annotations is matched based on the IOU, the training component 242 may determine a loss for classification(s) output by the combined model based on the classification in the annotation and the classification output by the combined model.

Although localization component 226, prediction component 230, planning component 232, map(s) 238, and/or system controller(s) 240 are illustrated as being stored in memory 220, any of these components may include processor-executable instructions, machine-learned model(s) (e.g., a neural network), and/or hardware and all or part of any of these components may be stored on memory 224 or configured as part of computing device(s) 214.

As described herein, the localization component 226, the perception component 228, prediction component 230, planning component 232, and/or other components of the system 200 may comprise one or more ML models. For example, the localization component 226, the perception component 228, prediction component 230, and/or the planning component 232 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 220 may additionally or alternatively store one or more system controller(s) 240, which may be configured to control steering, propulsion, braking, safety, emitters, communication, and other systems of the vehicle 202. These system controller(s) 240 may communicate with and/or control corresponding systems of the drive component(s) 212 and/or other components of the vehicle 202. For example, the planning component 232 may generate instructions based at least in part on perception data and prediction data generated by the perception component 228 and prediction component 230. The system controller(s) 240 may control operation of the vehicle 202 based at least in part on the instructions received from the planning component 232.

It should be noted that while FIG. 2 is illustrated as a distributed system, in alternative examples, components of the vehicle 202 may be associated with the computing device(s) 214 and/or components of the computing device(s) 214 may be associated with the vehicle 202. That is, the vehicle 202 may perform one or more of the functions associated with the computing device(s) 214, and vice versa.

Example Process

Figure 3:
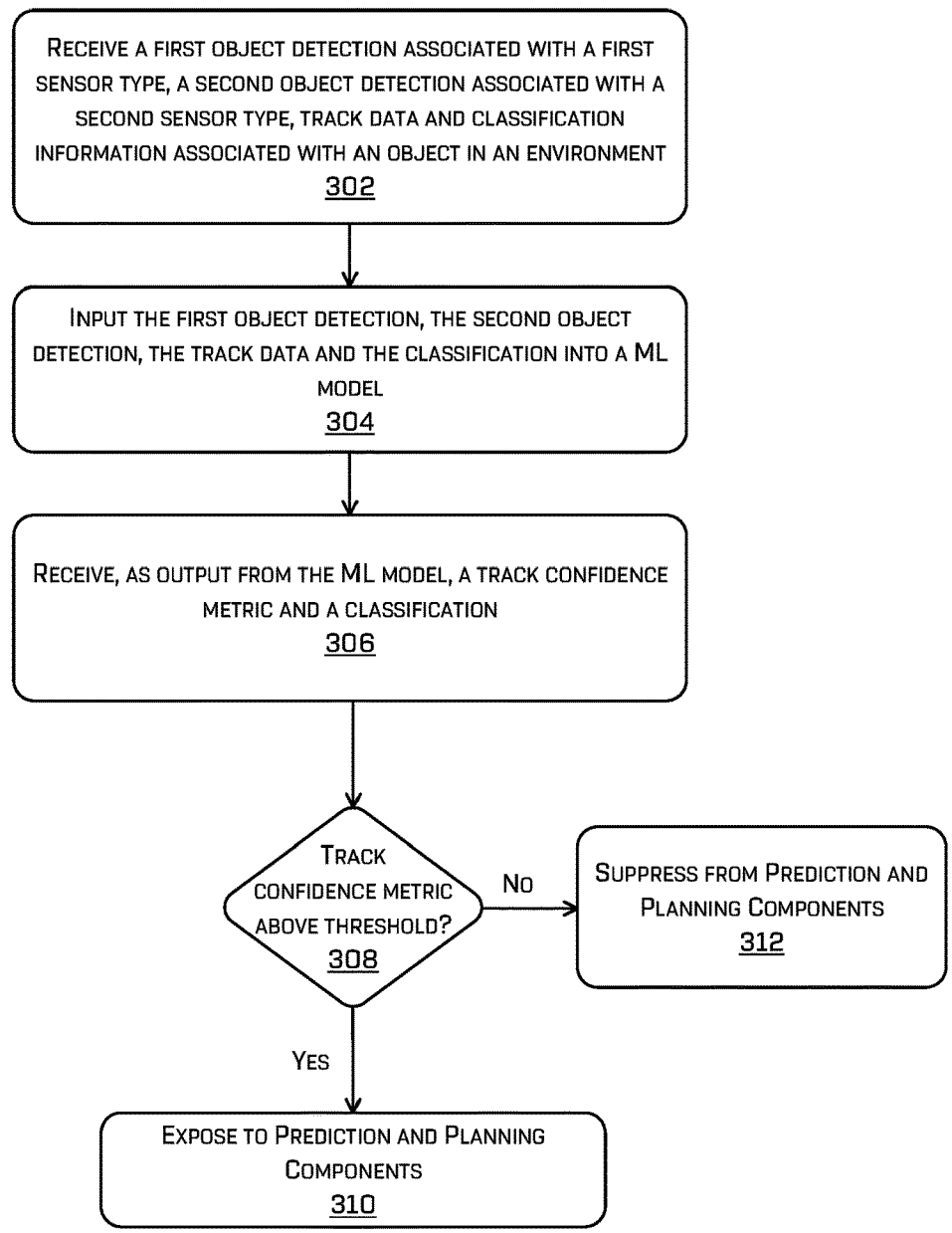
FIG. 3 illustrates a flow diagram of an example process for determining a track confidence metric and a classification from aggregated track data.

FIG. 3 illustrates a flow diagram of an example process 300 for determining a track confidence metric and a classification based at least in part on aggregated track data. The aggregated track data may include a track that associates one or more object detections associated with a same time and/or one or more object detections associated with a previous time. In some examples, process 300 may be performed by an ML model that determines a metric representing the likelihood that the track and/or object detection(s) associated therewith are a false positive and/or a classification of an object represented associated with the aggregated track. If the track is a false positive, the example process 300 may comprise suppressing the output of the aggregated track to a prediction and planning components. Otherwise, the example process 300 may comprise outputting the aggregated track to the prediction and planning components. The combined model 114 or 236 of systems 100 and 200, respectively, may perform the process 300, although it is contemplated that one or more other components may perform at least part of example process 300.

At 302, example process 300 may comprise receiving a first object detection associated with a first sensor type, a second object detection associated with a second sensor type, and/or other track data and classification information associated with an object in an environment. For example, an example set of data that may be received may include, for example, lidar, radar, vision (e.g., thermal and/or visible light spectrum image(s)), and fusion pipeline object detections such as semantic segmentation probabilities for lidar and vision (e.g., in the form of float probability vectors); a metric indicating the existence of object detections associated with the track for each perception pipeline; object detection statistics for the track such as total number of voxels in lidar object detections, vision object detection confidence, radar object detection doppler ambiguity resolving status, and so on (which may be input to the combined model as continuous float values). The process 300 may additionally or alternatively receive as input classification data and/or top down segmentation probabilities (e.g., see U.S. patent application Ser. No. 15/963,833, which is incorporated in its entirety herein). Further, the received data may additionally or alternatively include geometry statistics, such as velocity, extent, fraction occluded, distance from the device including the sensors, and so on. In addition to the above data, any previously generated data associated with the track from prior cycles, ticks, or operations may also be utilized by the combined model.

At 304, example process 300 may comprise providing the first object detection, the second object detection, the other track data and/or the classification information as input to a ML model of the combined model. The combined model may then receive, as output from the ML model of the combined model, a track confidence metric and a classification at 306. The combined model may, in some examples, comprise a single machine learned model that may infer both the track confidence metric for a track and a classification of an object associated with the track. More specifically, the ML model may be a single multi-layer perceptron model which may operate based on aggregated track data including data from multiple perception pipelines to generate the track confidence metric and a classification (which may include both a coarse and a fine grained classification) of an object associated with the aggregated track data. In some examples, the ML model may comprise an additional or alternate type of ML model and/or other accompanying components, such as a long short-term memory for receiving data associated with multiple input cycles. Additional details of the operation of combined model may be understood with reference to the discussion above of combined model 114 and 236.

In some examples, the ML model of the combined model may be trained by using supervised and/or semi-supervised learning techniques. The training the ML model may comprise determining a loss associated with an output of the ML model and backpropagating the loss through the ML model. In some examples, determining a loss may be based at least in part on a difference between the track confidence metric and/or the coarse and/or fine classification(s) and ground truth data. For example, the loss may be based at least in part on ground truth that specifies a current ROI and/or a previous ROI in a prior input cycle to which the current ROI corresponds and coarse and/or fine classifications for an object associated with the current ROI. In those examples where multiple perception pipelines are to be used, the ground truth data may include ROIs for one or more types of sensor data. Training the ML model may comprise altering one or more parameters of the ML model to reduce the loss. Backpropagating the loss to train the ML model in this manner may further refine the accuracy of the ML model. In some examples, the training of the ML model may use multiple losses and propagate the multiple losses back for refinement.

At 308, example process 300 may comprise determining whether the track confidence metric satisfies a threshold at 308. As mentioned above, the track confidence metric may indicate the likelihood that track data aggregated from multiple perception pipelines (referred to herein as aggregated track data of track) corresponds to an object in the environment. For example, the track confidence metric may be a value between 0 and 1, where 0 represents an indication by the combined model that the track has a low likelihood of being a true positive and where 1 indicates that the track has a high likelihood of being a true positive, although other permutations are contemplated. The threshold may be a value between 0 and 1 (e.g., 0.1, 0.5, 0.95), set depending on the implementation. The track confidence metric may satisfy the threshold by meeting or exceeding the threshold value or being less than a threshold value, depending on how the metric determination and threshold are set up.

If the track confidence metric satisfies the threshold, the process may continue to 310. Otherwise, the process may continue to 312.

At 310, the example process 300 may comprise transmitting a track associated with the first object detection, the second object detection, and/or the track data to the prediction and/or planning components along with the classification output by the combined model.

At 312, the example process 300 may comprise suppressing the track associated with the first object detection, the second object detection, the other track data and classification information to the prediction and planning components from the prediction and planning components. In some examples, the example process 300 may suppress a track by blocking an output or not outputting the track data of the track to the prediction and planning components.

As above, examples are not limited to those that determine whether to output tracks to the prediction and/or planning components based on the track confidence measures. In other examples, the associated track may be output with the track confidence metric to the prediction and/or planning components of the automated operation system regardless of the value of the track confidence metric. In turn, the prediction and/or planning components may utilized the track confidence metric to determine a weight (e.g. a up-weight or down-weight) to give the associated track.

Figure 4:
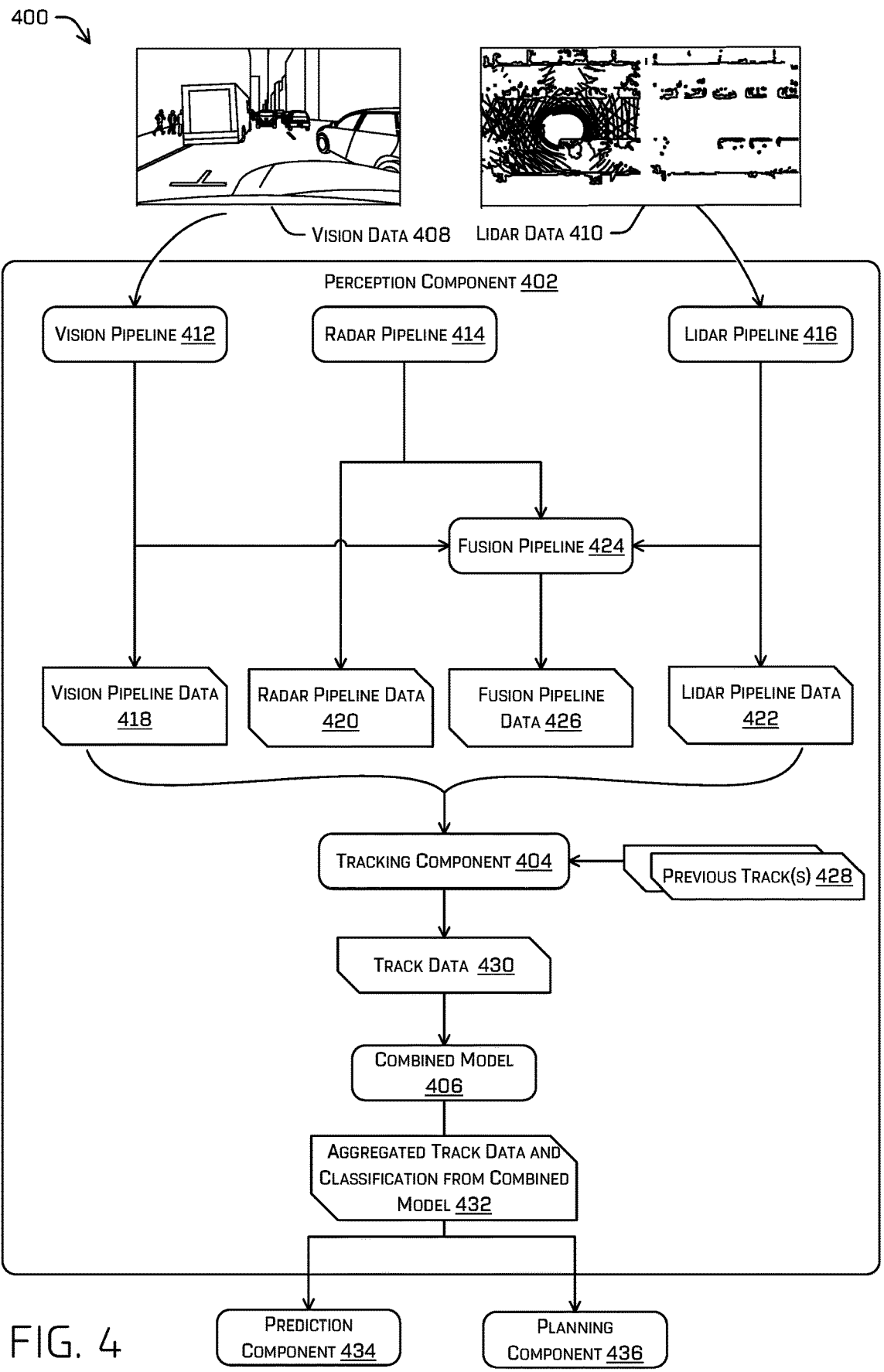
FIG. 4 illustrates an example data flow diagram of a perception component of an autonomous vehicle including a combined track confidence and classification model.

FIG. 4 illustrates a block diagram of an example data flow 400 within a perception component 402 of an autonomous vehicle (e.g., component 110 or 228) including a tracking component 404 and a combined model 406 (e.g., combined model 114 and/or 236).

As shown in FIG. 4, the perception component 402 may receive various types of sensor data such as vison data 408, lidar data 410 and radar data (not shown). The various types of sensor data may be input to perception pipelines such as vision pipeline 412, radar pipeline 414 and lidar pipeline 416.

The pipelines 412-416 may perform detection operations for their respective sensor data inputs to determine vision pipeline data 418, radar pipeline data 420, and/or lidar pipeline data 422.

One or more additional or alternative perception pipelines may receive raw sensor data and/or the output of other perception pipeline(s) to produce pipeline data. An example is shown in FIG. 4 as the fusion pipeline 424. In particular, the fusion pipeline 424 may receive as input vision pipeline data 418, radar pipeline data 420, and/or lidar pipeline data 422 and perform further detection operations to produce fusion pipeline data 426. Details of the operations of a fusion pipeline may be understood with regard to the discussion of a fusion detector above.

The tracking component 404 may receive as input any one or more of the pipeline data 418-422 and/or 426 and previous track(s) 428. Based on the pipeline data 418-422 and/or 426 and/or previous track(s) 428, the tracking component 404 may determine tracks and produce corresponding aggregated track data 430. The aggregated track data may be aggregated from the data 418-422, 426, and/or 428 based on the discussion above with regard to FIGS. 1, 2, and 3.

The tracking component 404 may provide the aggregated track data 430 may to the combined model 406. The combined model may determine a track confidence metric and classification information for tracked objects of each track of the aggregated track data. The classification information may include a coarse classification and/or a fine-grained classification for the tracked object. In some autonomous vehicle implementations of an autonomous operation system, coarse classifications may include general categories such as vehicle, pedestrian, bicyclist, and clutter while fine classifications may be, for example, more specific subcategories with service vehicle, motorcycle, tractor-trailer, sedan, pickup, and so on being fine classifications within the coarse classification of vehicle. The combined model may then output data 432 which may include the aggregated track data for the track 430 and the classification from the combined model 406 to a prediction component 434 and/or a planning component 436, which may correspond to the prediction components 116 or 230 and/or the planning components 118 or 232, respectively, if the track confidence metric satisfies a threshold.

EXAMPLE CLAUSES

A. A method comprising: receiving sensor data comprising first sensor data of a first type and second sensor data of a second type; determining, based at least in part on the sensor data associated with the first type, a first object detection of an object represented in the sensor data; determining, based at least in part on the sensor data associated with the second type, a second object detection of the object represented in the sensor data; receiving a track associated with the object, the track comprising one or more previous object properties; inputting the first object detection, the second object detection, and at least a portion of the track into a machine-learning (ML) model; receiving, as output from the ML model, a track confidence metric and a classification of the object, the track confidence metric comprising a likelihood that the track is a true positive; and outputting the track to a planning component of an autonomous vehicle based at least in part on the track confidence metric.

B. The method of clause A, wherein the classification comprises a coarse object classification associated with a category of objects and a fine classification associated with a sub-category of objects within the category.

C. The method of clause A, further comprising: determining, by the planning component, instructions for controlling the autonomous vehicle based at least in part on the track; and controlling the autonomous vehicle based at least in part on the instructions.

D. The method of clause A, wherein outputting the track to the planning component comprises determining the track confidence metric meets or exceeds a confidence threshold.

E. The method of clause A, wherein at least one of the first object detection or the second object detection comprises at least one of: a representation of the environment from a top-down perspective; an indication that a portion of the environment is occupied; a region of interest associated with the object; an object classification associated with the object determined by a perception pipeline associated with the first sensor type; a sensor data segmentation; a voxelization of sensor data; or a yaw associated with the object.

F. A system comprising: one or more processors; and a memory storing processor-executable instructions that, when executed by the one or more processors, cause the system to perform operations comprising: inputting at least a portion of a track associated with a first object detection of an object in an environment and a second object detection of the object in the environment into a machine-learning (ML) model; receiving, as output from the ML model, a track confidence metric and a classification of the object, the track confidence metric comprising a likelihood that the track is a true positive; and outputting the track, the track confidence metric and the classification to a planning component.

G. The system of clause F, the operations further comprising: wherein inputting at least the portion of the track into the machine learning model further comprises inputting an object detection confidence value associated with the first object detection into the ML model.

H. The system of clause G, wherein the outputting of the track to the planning component comprises determining the track confidence metric meets or exceeds a confidence threshold.

I. The system of clause F, wherein at least one of the first object detection or the second object detection comprises at least one of: a representation of the environment from a top-down perspective; an indication that a portion of the environment is occupied; a region of interest associated with the object; an object classification associated with the object determined by a perception pipeline associated with the first sensor type; a sensor data segmentation; a voxelization of sensor data; or a yaw associated with the object.

J. The system of clause F, wherein: the track is further associated with a first prior object detection associated with a time previous to a time at which the first object detection was generated and previous to a time at which the second object detection was generated; and at least the portion of the track into the ML model further comprises inputting at least the first prior object detection into the ML model.

K. The system of clause F, wherein the first object detection is associated with a first sensor type; and the second object detection is associated with a second sensor type.

L. The system of clause F, the operations further comprising: generating, by the planning component, control information for an autonomous vehicle at least in part by adjusting a weight of the track in the generating of the control information based on the track confidence metric.

M. The system of clause F, the operations further comprising: generating, by the planning component, control information for an autonomous vehicle based on the track; and controlling the autonomous vehicle based on the control information.

N. The system of clause F, wherein the first sensor type comprises at least one of lidar, radar, sonar, time-of-flight (TOF), or a camera.

O. A non-transitory computer-readable medium storing processor-executable instructions that, when executed by one or more processors, cause the one or more processors to perform operations comprising: receiving a track associated with a first object detection of an object in an environment and a second object detection of the object in the environment; inputting at least a portion of the track into a machine-learning (ML) model; receiving an output from the ML model, the output including a track confidence metric and a classification of the object; determining a loss based at least in part on the output; altering, as a trained ML model, one or more parameters of the ML model to reduce the loss; and transmitting the trained ML model to an autonomous vehicle.

P. The non-transitory computer-readable medium of clause O, the operations further comprising: receiving ground truth data associated with the first object detection; determining the loss based at least in part on the ground truth data; and performing the altering of the parameters by backpropagating the loss.

Q. The non-transitory computer-readable medium of claim 15, wherein: inputting at least the portion of the track into the ML model comprises inputting at least an object detection confidence value associated with the first object detection into the ML model.

R. The non-transitory computer-readable medium of clause O, wherein the first object detection is associated with a first sensor type; and the second object detection is associated with a second sensor type.

S. The non-transitory computer-readable medium of clause O, wherein: the track is further associated with a first prior object detection associated with a time previous to a time at which the first object detection was generated and previous to a time at which the second object detection was generated; and the portion of the track comprises at least of portion of each of the first prior object detection, the first object detection and the second object detection.

T. The non-transitory computer-readable medium of clause O, wherein at least one of the first object detection or the second object detection comprises at least one of: a representation of the environment from a top-down perspective; an indication that a portion of the environment is occupied; a region of interest associated with the object; an object classification associated with the object determined by a perception pipeline associated with the first sensor type; a sensor data segmentation; a voxelization of sensor data; and a yaw associated with the object.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving sensor data comprising first sensor data of a first type and second sensor data of a second type;
determining, based at least in part on the sensor data associated with the first type, a first object detection of an object represented in the sensor data;
determining, based at least in part on the sensor data associated with the second type, a second object detection of the object represented in the sensor data;
receiving a track associated with the object, the track comprising one or more previous object properties;
inputting the first object detection, the second object detection, and at least a portion of the track into a machine-learning (ML) model;
receiving, as output from the ML model, a track confidence metric and a classification of the object, the track confidence metric comprising a likelihood that the track is a true positive; and
outputting the track to a planning component of an autonomous vehicle based at least in part on the track confidence metric, wherein at least one of the first object detection or the second object detection comprises at least one of:
a representation of an environment from a top-down perspective;
an indication that a portion of the environment is occupied;
a region of interest associated with the object;
an object classification associated with the object determined by a perception pipeline associated with a first sensor type;
a sensor data segmentation;
a voxelization of sensor data; or
a yaw associated with the object.

2. The method of claim 1, wherein the classification comprises a coarse object classification associated with a category of objects and a fine classification associated with a sub-category of objects within the category.

3. The method of claim 1, further comprising:
determining, by the planning component, instructions for controlling the autonomous vehicle based at least in part on the track; and
controlling the autonomous vehicle based at least in part on the instructions.

4. The method of claim 1, wherein outputting the track to the planning component comprises determining the track confidence metric meets or exceeds a confidence threshold.

5. A system comprising:
one or more processors; and
a memory storing processor-executable instructions that, when executed by the one or more processors, cause the system to perform operations comprising:
inputting at least a portion of a track associated with a first object detection of an object in an environment and a second object detection of the object in the environment into a machine-learning (ML) model;
receiving, as output from the ML model, a track confidence metric and a classification of the object, the track confidence metric comprising a likelihood that the track is a true positive; and
outputting the track, the track confidence metric and the classification to a planning component, wherein at least one of the first object detection or the second object detection comprises at least one of:
a representation of the environment from a top-down perspective;
an indication that a portion of the environment is occupied;
a region of interest associated with the object;
an object classification associated with the object determined by a perception pipeline associated with a first sensor type;
a sensor data segmentation;
a voxelization of sensor data; or
a yaw associated with the object.

6. The system of claim 5, wherein inputting at least the portion of the track into the ML model further comprises inputting an object detection confidence value associated with the first object detection into the ML model.

7. The system of claim 6, wherein the outputting of the track to the planning component comprises determining the track confidence metric meets or exceeds a confidence threshold.

8. The system of claim 5, wherein:
the track is further associated with a first prior object detection associated with a time previous to a time at which the first object detection was generated and previous to a time at which the second object detection was generated; and
the inputting at least the portion of the track into the ML model further comprises inputting at least the first prior object detection into the ML model.

9. The system of claim 5, wherein:
the first object detection is associated with the first sensor type; and
the second object detection is associated with a second sensor type.

10. The system of claim 5, the operations further comprising:
generating, by the planning component, control information for an autonomous vehicle at least in part by adjusting a weight of the track in the generating of the control information based on the track confidence metric.

11. The system of claim 5, the operations further comprising:
generating, by the planning component, control information for an autonomous vehicle based on the track; and
controlling the autonomous vehicle based on the control information.

12. The system of claim 5, wherein the first sensor type comprises at least one of lidar, radar, sonar, time-of-flight (TOF), or a camera.

13. A non-transitory computer-readable medium storing processor-executable instructions that, when executed by one or more processors, cause the one or more processors to perform operations comprising:
receiving a track associated with a first object detection of an object in an environment and a second object detection of the object in the environment
inputting at least a portion of the track into a machine-learning (ML) model;
receiving an output from the ML model, the output including a track confidence metric and a classification of the object;
determining a loss based at least in part on the output;
altering, as a trained ML model, one or more parameters of the ML model to reduce the loss; and
transmitting the trained ML model to an autonomous vehicle, wherein at least one of the first object detection or the second object detection comprises at least one of:

a representation of the environment from a top-down perspective;

an indication that a portion of the environment is occupied;

a region of interest associated with the object;

an object classification associated with the object determined by a perception pipeline associated with a first sensor type;

a sensor data segmentation;

a voxelization of sensor data; and a yaw associated with the object.

14. The non-transitory computer-readable medium of claim 13, the operations further comprising:

receiving ground truth data associated with the first object detection;

determining the loss based at least in part on the ground truth data; and performing the altering of the parameters by backpropagating the loss.

15. The non-transitory computer-readable medium of claim 13, wherein inputting at least the portion of the track into the ML model comprises inputting at least an object detection confidence value associated with the first object detection into the ML model.

16. The non-transitory computer-readable medium of claim 13, wherein:

the first object detection is associated with the first sensor type; and the second object detection is associated with a second sensor type.

17. The non-transitory computer-readable medium of claim 13, wherein:

the track is further associated with a first prior object detection associated with a time previous to a time at which the first object detection was generated and previous to a time at which the second object detection was generated; and the portion of the track comprises at least of portion of each of the first prior object detection, the first object detection and the second object detection.

* * * * *